United States Patent

Merriam

[15] 3,675,042
[45] July 4, 1972

[54] APPARATUS FOR POWER TRANSMISSION UTILIZING SUPERCONDUCTIVE ELEMENTS

[72] Inventor: Marshall F. Merriam, Berkeley, Calif.
[73] Assignee: Gulf Oil Corporation, San Diego, Calif.
[22] Filed: March 13, 1970
[21] Appl. No.: 18,385

Related U.S. Application Data

[63] Continuation of Ser. No. 703,582, Feb. 7, 1968.

[52] U.S. Cl..............................307/147, 174/15, 174/113, 174/126, 335/216
[51] Int. Cl........................................H01b 7/34, H02g 9/06
[58] Field of Search.....................174/DIG. 6, 126, 15, 15 C, 174/16, 28, 29, 113; 335/216; 307/147

[56] References Cited

UNITED STATES PATENTS

| | | | |
|---|---|---|---|
| 3,292,016 | 12/1966 | Kafka | 307/90 |
| 3,301,937 | 1/1967 | Burnier et al. | 174/15 |
| 3,343,035 | 9/1967 | Garwin | 174/15 X |
| 3,349,169 | 10/1967 | Donadieu | 174/128 |
| 3,372,470 | 3/1968 | Bindari | 174/DIG. 6 |
| 3,428,926 | 2/1969 | Bogner et al. | 335/216 |
| 3,431,347 | 3/1969 | Kafka et al. | 174/15 |

FOREIGN PATENTS OR APPLICATIONS 1,061,927  3/1967  Great Britain...........................174/15

OTHER PUBLICATIONS

Garwin, R. L. & Matisod, J.; Superconducting Lines for the Transmission of Large Amounts of Electrical Power Over Great Distances, In Proceedings of the IEEE Vol. 55, No. 4, April 1967, pp. 538–548

Primary Examiner—Lewis H. Myers
Assistant Examiner—A. T. Grimley
Attorney—Fitch, Even, Tabin & Luedeka

[57] ABSTRACT

An electrical power transmission line utilizing superconductivity is provided in which each conductor includes a superconductive portion and a normally conductive portion having high thermal conductivity with the two portions being in electrical and thermal contact along substantially their entire lengths. The conductors are in the shape of thin wires to provide a low magnetic field and permit high current densities. The conductors are connected in pairs into a plurality of direct current circuits which in turn are connected to one another in parallel and are arranged in a plurality of circular clusters to further minimize the magnetic field and which may be selectively connected between a power source and one or more loads.

3 Claims, 6 Drawing Figures

INVENTOR
MARSHAL F. MERRIAM

Anderson, Luedeka, Fitch, Even & Tabin
ATTYS.

INVENTOR
MARSHAL F. MERRIAM

Anderson, Luedeka, Fitch, Even & Tabin
ATTYS.

APPARATUS FOR POWER TRANSMISSION UTILIZING SUPERCONDUCTIVE ELEMENTS

This application is a continuation of my copending application, Ser. No. 703,582, filed Feb. 7, 1968.

This invention relates generally to electrical power transmission and, more particularly, to a power transmission line utilizing superconductive elements.

The transmission of large amounts of electrical power over long distances has become a subject of increasing interest due to the advantages of power pooling in which separate power systems having different load distributions are linked so that each system requires less reserve generating capacity. The increasing desirability of locating generating plants, both of the nuclear type and the fossil fuel type, at points remote from load centers also contributes to the need for improvements in transmission techniques. Power transmission methods which are sufficiently economical may even make it cheaper to generate power at the fuel source and to transmit the power to the load center rather than to transport the fuel to the load center before converting it to electrical energy. Sources of electrical energy now considered too remote to use may become accessible with improved transmission capabilities.

At present most power transmission takes place over overhead power lines and only a small amount utilizes underground or surface level lines. Although such underground or surface lines are generally more expensive than overhead lines, the former are coming into greater use for aesthetic reasons and due to considerations of safety and reliability. As ground lines have found greater application, the possibility of utilizing the phenomenon of superconductivity in power transmission has received greater attention, since it is only with underground or surface installations that the refrigeration of the entire power line necessary for superconductivity becomes practical. Power transmission using superconductive conductor elements, at least in theory, has two distinct advantages over conventional methods: the high current carrying capacity of superconductive materials which would facilitate transmitting large amounts of power, and the complete absence of resistance and, hence, of ohmic losses which would facilitate transmission for long distances.

Nevertheless, practical superconductive transmission lines have yet to be constructed. An important obstacle has been the great mass of the insulated conductor or cable portion of the transmission line even when superconductive elements are utilized. This mass may be as much as 10 tons per kilometer, thus requiring the cable to consist of relatively short sections electrically joined at frequent intervals. The art of making electrical joints of superconductive materials has not been fully developed and the use of normal materials, of course, would tend to offset the advantages of using superconductive materials. Other difficulties include the problems of refrigerating the entire line below the superconductor's critical temperature and the maintenance of the adjacent magnetic field below the critical magnetic field. Failure on either score will result in the superconductive element being "quenched," i.e., losing its superconductive properties. A further problem is that localized energy transients in a superconductor operating near its critical limits may cause a small region to assume the normally conductive state, resulting in high heat dissipation in the region which in turn causes the region of normal conductivity to increase and ultimately the entire superconductor to fail.

Accordingly, it is an important object of the present invention to provide an improved electrical power transmission line utilizing superconductive elements.

Another important object of the invention is to provide a superconductive power line which can extend for long distances without splicing or joints.

Still another object of the invention is to provide a superconductive power line which will have high inherent reliability and will also continue to function without serious impairment in the event of the failure of some elements.

A further object of the invention is to provide a superconductive power line over which large amounts of power can be transmitted at relatively small voltages.

A still further object of the invention is to provide a superconductive power line which can be tapped at various points along its length for various amounts of power.

Other objects and advantages of the invention will become apparent from the following description taken in connection with the accompanying drawings, in which.

Figure 1:
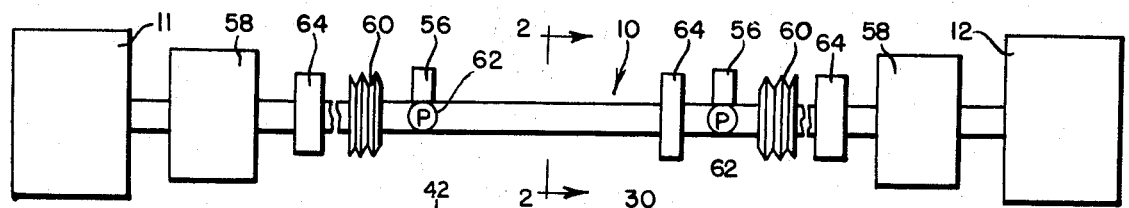
FIG. 1 is a side view in diagrammatic form of a superconductive power transmission line.
Figure 2:
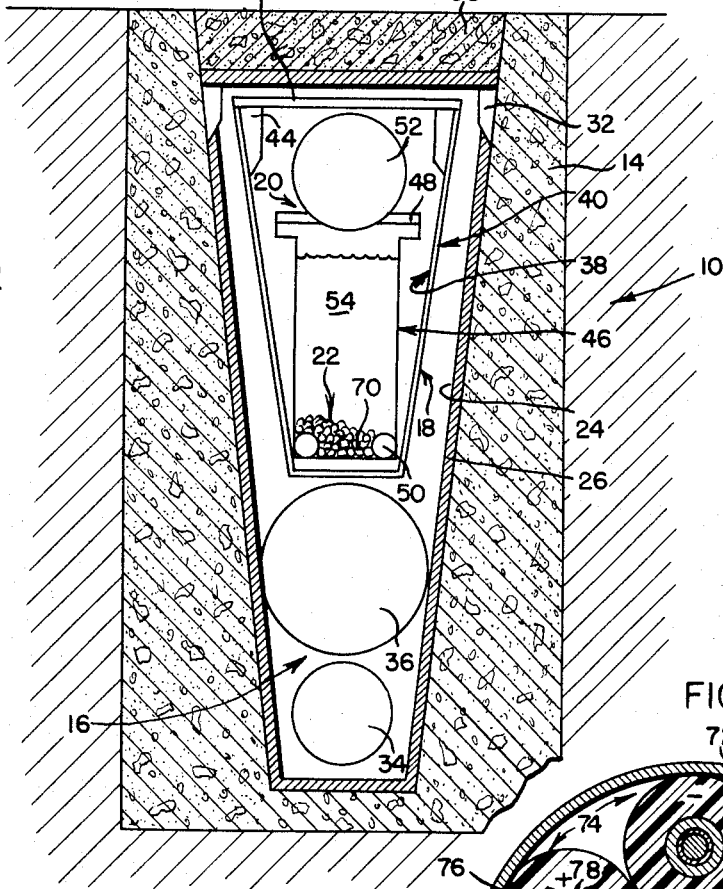
FIG. 2 is a cross sectional view of the power transmission line of FIG. 1 taken along line 2—2.

As best shown in FIGS. 1 and 2, a superconductive power transmission line 10 extends between a power source 11 which may be an electrical power generating station and a load 12 which may be a stepdown transformer station or any other facility which utilizes electrical power. The transmission line preferably transmits direct current power since it is designed for long distance underground or surface level transmission and for such an application the charging current resulting from the voltage difference between opposing alternating current conductors becomes excessive. Further, heating effects of alternating current make maintenance of the low temperatures required for superconductivity difficult. Conversion to and from alternating current at each end of the line, if desired may, of course, be accomplished by conventional means. This is not to say, however, that principles of the present invention might not be used in short distance or alternating current transmission lines.

The illustrated transmission line 10, as best shown in cross section in FIG. 2, includes an outer casing 14 extending along the length of the cable within which are disposed elements of a first level or medium low temperature refrigeration system 16 and an inner casing 18. Within the inner casing are disposed a second level base or lowest temperature refrigeration system 20 and a power transmission system or cable 22.

It will be understood that the present invention relates primarily to the power transmission system or cable. However, many of its advantages can best be appreciated in the environment of specific housings and refrigeration systems which provide the low temperatures required to utilize superconductive elements. Hence, the description will begin with a brief exposition of the environment.

More specifically, the outer casing 14 comprises an elongated body which is rectangular in cross section and may be formed of concrete poured at the site of the power line above or below grade as desired although, as illustrated, its top is just at the grade level. The casing 14 has a central recess 24, the sides of which taper downwardly from the top of the casing to form an elongated trough. The inner surface of the recess 24 is covered with a metal lining 26 which may be glued to the concrete casing with epoxy resin. The metal liner, which may be of aluminum, stainless steel, tin plated steel or the like, serves as a shield to radiant heat. The joints of the metal liner are made vacuum tight by soldering or bonding with epoxy resin as desired. The top of the recess 24 is closed by a concrete cover 30 which is also bonded at its inner face to a metal liner. The cover 30 is provided with a suitable vacuum sealing means 32 such as rubber gaskets and O-rings so that the assembled outer casing 14 may be made vacuum tight. The cover 30 extends longitudinally of the line 10 and includes sections of varying sizes, as desired, some or all of which may easily be removed for inspection or repair of the line and also may include spaced apertures for vacuum pumping lines.

Within the recess 24 are elements of the first level or medium low temperature refrigeration system 16 which utilizes nitrogen as a refrigerant. The nitrogen is circulated in liquid form in one direction along the line 10 through a liquid nitrogen conduit 34 and returns in the opposite direction in gaseous form under high pressure, e.g., about 10 atmospheres, through a gaseous nitrogen conduit 36. The nitrogen conduits are supported one above the other on the bottom of the trough by heat insulating supports so as to insulate the metal liner which is at ambient temperature from the first level refrigeration system. The nitrogen refrigeration system may be designed with parameters which permit the inner casing 18 to be maintained at about 77° K.

Above the nitrogen conduits and supported thereon by heat conducting supports is positioned the elongated inner casing 18. The inner casing is in the form of an elongated vacuum flask with an inner wall 38, an outer wall 40 and a removable top 42 having suitable vacuum seals 44 where it joins the walls 40 and 42. The space between the two walls 38 and 40 may be filled with evacuated super insulation or may simply be a vacuum.

As illustrated the inner casing 18 includes a generally rectangular cross sectioned tank 46 within which are positioned elements of the lowest or base temperature cooling system 20 and the cable 22. The tank 46 is closed at its upper end by a sealable and removable flanged top 48 which extends beyond the side walls of the tank. Within the tank and, as illustrated, near its bottom are positioned longitudinally extending coolant conduits 50 which, as illustrated, are two in number although one or more could be utilized. The coolant may be liquid helium or compressed gaseous helium under high pressure. Above the tank 46 and in thermal contact with the flanged top 48 is a return helium conduit 52 for returning the helium to its source after it has cooled the cable. Within the tank are positioned the cable 22 and a quantity of additional coolant 54 which covers the cable 22. This additional coolant also may be liquid helium or compressed gaseous helium under high pressure. The coolants aid in maintaining the cable at a temperature sufficiently low that the superconductive elements in the cable will be in a superconductive state. Specifically, a temperature of no more than about 5° K. is desirable.

As illustrated in FIG. 1, the transmission line 10 also includes vacuum pumps 56 at appropriate intervals for evacuating the space between the walls 38 and 40 and within the central recess 24. Also at suitably spaced intervals along the line are positioned refrigeration stations 58 which supply the liquid nitrogen and liquid or compressed gaseous helium to their respective conduits and to which the gaseous nitrogen and the spent helium coolant are returned.

As also illustrated in FIG. 1, the line may be provided with suitably spaced bellows devices 60 to provide for expansion and contraction of the line length during the cooling down and heating up of the line before and after operation. Additional circulating pumps 62 for the helium and nitrogen refrigerants may also be provided between the refrigerating stations. Further, liquid vapor separators 64 may be provided between refrigerating stations to meet problems raised by the gradual vaporization of the refrigerants as they move along the liquid phase conduits away from the refrigerating stations by removing vapor from the outgoing conduit and shunting it to the return conduit. All of these devices, however, are conventional and might even be dispensed with in some applications where the problems they solve do not arise. All such auxiliary devices may receive electrical power from an auxiliary cable.

In general, the cable 22 comprises a plurality of conductor clusters 70 positioned on the bottom of the tank 46. Each of the conductor clusters includes a central supporting wire 71 and wrapped therearound an even number of conductors 72 which include a superconductive portion and pairs of which form circuits 74 for the transmission of power. All of the circuits 74 are connected in parallel with one another. As illustrated, each cluster comprises six conductors 72 or three circuits 74. The parallel connection of the circuits 74 permits the capacity of the line to be modified by adding or removing, and connecting or disconnecting individual ones of such circuits or individual clusters 70 from the load or power source. This feature also facilitates tapping the power carried by the transmission line at midpoints, either to operate auxiliary line equipment or for other purposes and contributes to reliability. Each of the conductor clusters is light in weight so that lengths of 100 kilometers or more may be shipped and laid in the tank as a unit without mid-line electrical connections, yet large amounts of current may be carried and, hence, large amounts of power transmitted, by a plurality of such clusters. The superconducting portion of such conductor is in intimate contact with a normally conducting material having high thermal conductivity so as to stabilize the superconducting portion in that state and thus improve reliability.

Figure 3:
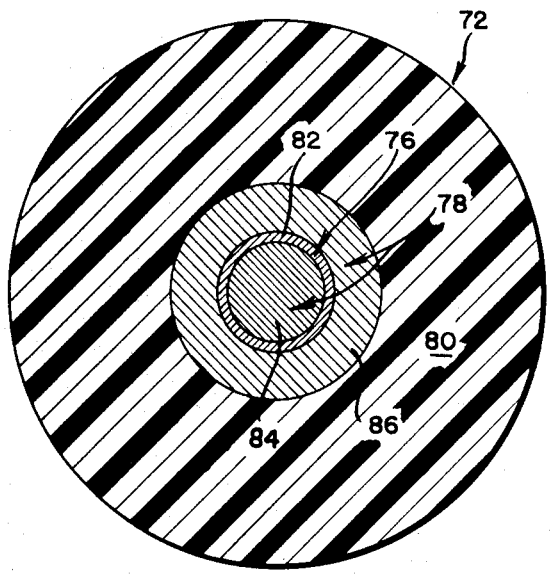
FIG. 3 is a cross section of an individual conductor of the line.
Figure 4:
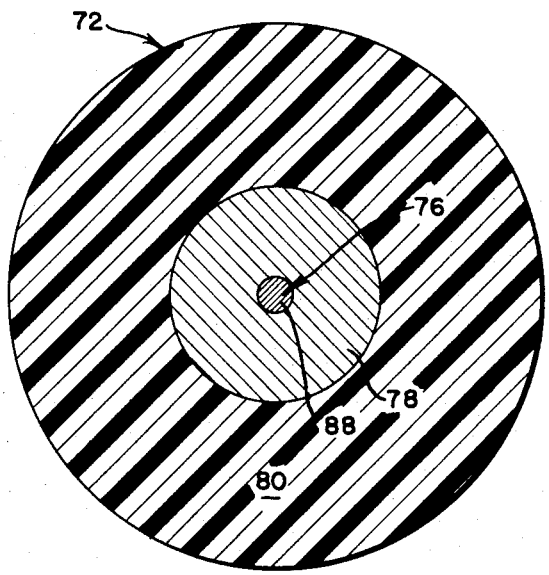
FIG. 4 is a cross section of another form of individual conductor of the line.

Accordingly, the basic element of the cable is the single conductor 72 which is connected through the load 12 and power source 11 with a similar conductor to form a two conductor circuit 74. Two forms of such a conductor are illustrated in the cross sectional views of FIGS. 3 and 4. As illustrated in FIGS. 3 and 4 the conductor 72 comprises a superconductive portion 76 formed of a material such as niobium tin ($Nb_3Sn$) which is superconductive at the low temperatures less than about 5° K. produced by the refrigeration systems.

In order to maintain the superconductive portion 76 in that state despite energy transients, the conductor also includes a second portion 78 which is formed of a good normally electrically conductive material which also has high thermal conductivity. Copper, aluminum or certain alloys are suitable materials for this portion with aluminum being preferred in many applications due to its light weight. The two portions 76 and 78 are in electrical and thermal contact along substantially their entire lengths. A small amount of current may be carried by the normally conductive portion and it also may provide some mechanical support for the superconductive portion. The most important function of this portion, however, is to prevent the quenching of the entire superconductive portion if a small region of it goes into the normal state. This result is achieved since the second portion 78 provides a low resistance electrical path parallel with the superconductive portion and the heat generated in a region which switches into its normal state is dissipated in the highly thermally conductive second portion 78. Thus, the normal region does not grow but instead cools below its critical temperature and becomes superconducting again. The superconductive portion 76 and the normally conductive portion 78 are enveloped in a layer of electrical insulation 80 which has good heat conducting properties to aid in refrigerating the superconductor. The thermal expansion qualities of the insulation should be matched with the remaining materials of the cable and, therefore, materials such as a plastic, vinyl or resin filled with a suitable filler such as alumina are preferred. Organic insulators such as polyethylene may be used but are less desirable due to the mismatch of thermal expansion properties.

As illustrated in FIG. 3, the superconductive portion 76 has the form of a hollow cylinder 82 or, as seen in cross section, an annulus. The cylinder 82 surrounds a central wire 84 which comprises part of the normally conductive portion 78. Surrounding the superconductive cylinder 82 is a layer 86 which is normally conductive and comprises the remainder of the normally conductive portion. The layer 86 is surrounded by the insulating layer 80. The two normally conductive portions 84 and 86 need not be of the same material but the outer portion is preferably aluminum.

As illustrated in FIG. 4, the superconductive portion 76 comprises a central wire 88 which is surrounded by the normally conductive portion 78 in the form of a coaxial hollow cylinder or annulus which in turn is surrounded by insulation 80.

Figure 5:
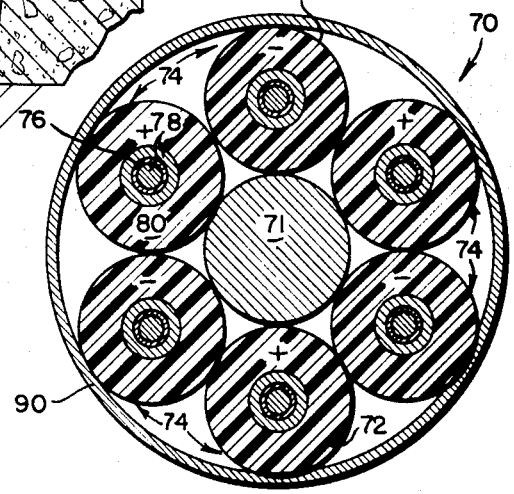
FIG. 5 is a cross section of one of the cable clusters of the line.

The individual conductors 72, which may be of either illustrated type, are connected into a plurality of circuits 74 and are grouped together in clusters 70, one of which is illustrated in FIG. 5. In such a cluster, an even number of the conductors are spaced at equal intervals around the central supporting wire 71 which may, for example, be made of steel. In order to minimize the magnetic field adjacent the conductors which, if excessive, might cause the superconductive portion to be quenched, the conductors are so connected that current in adjacent ones flows in opposite directions. Further, the two conductors in each circuit 74 are adjacent to one another so that failure of one circuit will have minimal effects on others. The central supporting wire and the conductors are held in their respective relative positions by an outer sheath 90 which desirably has good heat conducting properties and will withstand handling such as occurs in laying the cable.

A plurality of such clusters, each of which is a completely separate unit and is connected in parallel with other clusters, comprises the cable 22. It may be seen that the size and weight of each cluster may be much less than that of the entire cable since a large number of clusters may be used to make up the cable. Hence, the length of a cluster which may be wound on a spool and laid in one operation without the necessity for electrical joints is great. Indeed, continuous clusters of over 100 km. in length are believed feasible. Furthermore, heat is more easily dissipated from each separate cluster.

The desirable materials and dimensions of the conductors are, of course, interrelated and depend upon the operating parameters of the transmission line such as the voltage, current and the power to be transmitted. An important factor in determining such parameters is that, contrary to the situation with power lines utilizing normal conductors, low voltage operation conductors having small radii are desirable.

This may be seen by considering that for a normal conductor power line the maximum power that can be generated in the conductor by ohmic heating and safely dissipated without damaging the line ($P_{max}$) and the line resistance ($R$), determine the maximum allowable current that can be put through the line ($I_{max}$). Thus, if both $P_{max}$ and $I_{max}$ are in terms of unit line length $P_{max} = (I_{max})^2 R$. The value of $I_{max}$ depends, of course, on the conductor radius ($r$). $P_{max}$ depends approximately linearly on the surface area of the conductor. Since $P_{max}$ in the above equation is per unit length, it is proportional to $r$.

On the other hand, the resistance $R$ is proportional to $1/r^2$.

Hence, $I_{max}$ is proportional to $r^{3/2}$ and a normal conductor with a small radius is not suitable for conducting large currents. The power transported by the line is also the product of $I_{max}$ and the voltage ($V$) impressed on the line. However, the voltage cannot be made arbitrarily large. If $r$ is small and $V$ is too large, the electric field ($E$) at the surface of the conductor will be too high and corona breakdown will result.

The electric field at the surface of a cylindrical wire at a given voltage is proportional to the reciprocal of the radius. The maximum limit of E, called $E_{max}$, is the breakdown field of air, vacuum, or whatever is surrounding the wire. Thus, the maximum permissible voltage is proportional to the radius of the wire. Consequently, normal conductors of very small radius are not suitable for either high current or high voltage.

Figure 6:
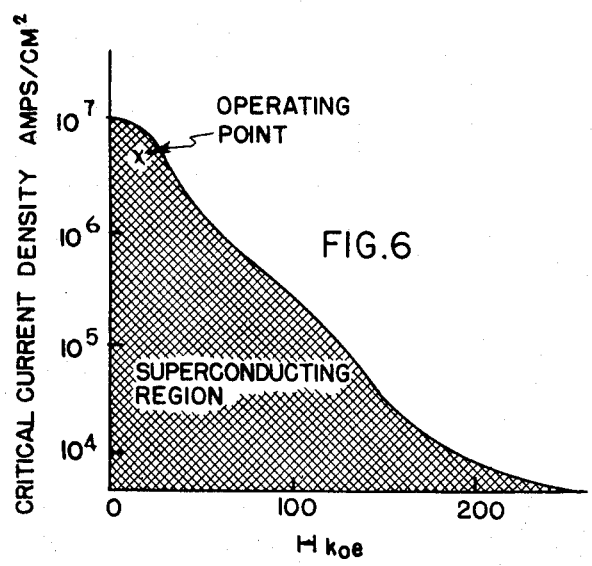
FIG. 6 is a diagram of the critical current density and critical magnetic field properties of a superconductive material which may be used in the line.

This is not true, however, for superconductors. A single superconducting conductor must be operated at a total current (I) low enough so that the magnetic field at the surface of the conductor does not exceed its critical value ($H_c$) and the current density ($J_c$) does not exceed its critical value. An exemplary graph of the critical current density and critical magnetic field for $Nb_3Sn$ at 4.2° K. is shown in FIG. 6. It may be seen that the highest current is possible only if the magnetic field is low and, clearly, the indicated operating point is preferable. To see how this may be achieved, consider the simple conductor geometry shown in FIG. 4. Since $$\oint H \cdot ds = \frac{4\pi}{10} I$$

then $$2\pi r H = \frac{4\pi}{10} I, H < H_c$$

On the other hand, $I_c$ must be no more than $J_c \pi r^2$ where $J_c$ is the critical current density, r the conductor radius and $I_c$ the critical total current. These two conditions put a restriction on r. If the wire is operated at $J_c$, then $I = I_c$, and r may not exceed $r_{max}$, given by $$2 r_{max} H_c = \frac{4\pi}{10} J_c (r_{max})^2$$

and $$r_{max} = \frac{5 H_c}{\pi J_c} \text{ (practical CGS units)}.$$

It thus appears that, contrary to the result for normal conductors, to use the high critical currents of superconductors at low magnetic fields, the conductors should be of small radius. Since corona effect limitations on the voltage between adjacent conductors are the same for superconductors as for normal conductors, which limitations were detailed above, small conductor radii mean that low-voltage operation is required. The maximum voltage dictated by corona limitations is, of course, determined by the outer radius of the metal conductor including the normally conductive material as well as the superconductor. Superconducting transmission in this geometry is thus seen to be most efficient at low voltages, just the opposite of the well-known situation for conventional transmission. Typical values for $Nb_3Sn$ at the indicated operating point are H equal to 15,000 Gauss and J equal to $5 \times 10^6$ Amp/cm². The value of $r_{max}$ may be calculated to be 0.048 mm. and $I_c$ is 360 Amp. In a specific embodiment based on these parameters a radius of 0.048 mm. was selected for a $Nb_3Sn$ superconductor. Desirably, the ratio of the volume of the normal portion 78, if made of aluminum, to the superconductive portion is at least about 10:1; hence, an outer radius for that portion of 0.6mm. was selected. The insulation was chosen with an outer radius of 1.0 mm.

Turning now to the conductor form shown in FIG. 3

Let $2r_1$ = the diameter of the normal metal core, $2r_2$ = the outer diameter of the superconducting layer, $2r_3$ = the outer diameter of the outer normal metal layer, and $2r_4$ = the outer diameter of the insulation.

The maximum magnetic field which affects the superconducting material occurs at $r_2$ and is given by $$H = \left[ \frac{r_2^2 - r_1^2}{2r_2} \right] J_c \times \frac{4\pi}{10}$$

For a given current $I = [\pi(r_2^2 - r_1^2) J_c]$ $$H = \frac{I}{5r_2}$$

Comparing the two conductor forms, $r_2$ will be larger than the superconducting core radius in the geometry of FIG. 4; hence, the magnetic field $H$ will be lower for the same current $I$. Therefore, with the same current as for that of the conductor of FIG. 4 the magnetic field will be lower, with the benefit of greater margin of safety under the critical field. Alternatively, increased current density is possible or with the same field the amount of superconducing material may be increased thus giving each strand the capacity to carry larger currents.

In a specific embodiment of the conductor of FIG. 3 the central core comprises Hastelloy – B alloy and has a diameter of 0.474 mm. The superconductive layer is of $Nb_3Sn$ and has an outer diameter of 0.526 mm. The outer portion of the normally conductive layer has an outer diameter of 1.00 mm. and the insulation has an outer diameter of 2.62 mm. Using the typical values of $H = 15,000$ Gauss and $J = 5 \times 10^6$ Amp/cm² previously mentioned, the current carried by each such conductor may be about 2,000 amps. A typical operating voltage for two such conductors connected into a circuit 74 is ± 13 kilovolts although a range of ± 50 kilovolts is believed feasible. A cluster of six such conductors connected into three circuits would carry 6,000 amp and only 32 such clusters would carry 192,300 amps. At a voltage of ± 13 kilovolts, over 5,000 megawatts of power could be transmitted.

It may be calculated that such a conductor has a mass of 7,630 grams per km. The mass of a cluster of six such conductors including a steel center wire with a density of 7.8 g/cm and a radius of 1.31 mm. is 88 kg/km. Thus it may be seen that a 100 km spool would weigh only about 19,400 lb. and the entire length of a very long cable could be laid without making any midline electrical connections. Assembly of the transmission line would simply involve placing in the tank prior to cooling as many clusters as are desired to permit the required amount of power to be transmitted.

It may be seen that the foregoing description has disclosed a new and useful approach to the problem of utilizing superconductivity in power transmission. The capacity of the line is adjustable in small increments and portions of the total may be tapped at midline points by connections into as many conductor circuits and clusters as desired. The numerous parallel circuits provide for greater reliability and the physical separation of the clusters facilitates cooling. The unique conductor configuration makes each separate conductor more reliable by stabilizing the superconductor and provides for a low magnetic field. The arrangement of the conductors in each cluster also contributes to a low magnetic field permitting higher current densities and, hence, greater power transmission at low voltages.

Various changes and modifications might be made in the above described power transmission line. For example, different and improved superconductive materials and different normally conductive materials might be used and the two conductors of each circuit 74 might be coaxial in arrangement. Further, the normally conductive and superconductive portions of the conductors might be formed into a matrix rather, than being physically distinct without departing from the spirit of the invention.

Various features of the invention are set forth in the appended claims.

What is claimed is:

1. A superconductive electrical power transmission line for transmission of power over distances of at least of the order of about 100 km. without intermediate electrical connections including at least a pair of conductors connected between a power source at one end of said line and a load at the other end of said line, each of said conductors comprising a first longitudinally extending portion formed of an electrically superconductive material, a second longitudinally extending portion formed of a material having high thermal conductivity and high normal-state electrical conductivity, and refrigeration means for maintaining said conductors at a temperature such that said material forming said first portion of said conductors is superconductive, said first and second portions being in electrical and thermal contact with one another along substantially their entire lengths so as to stabilize said first portion in a superconductive state, the diameter of each of said conductors being less than about 2 mm and extending continuously without midline electrical connections for at least one interval of at least of the order of about 100 km.

2. A superconductive electrical power transmission line in accordance with claim 1 wherein a plurality of said pairs of conductors are connected in parallel with one another so as to increase the reliability of the entire line and permit mid-line tapping of a selected portion of the power transmitted by said line.

3. A superconductive electrical power transmission line in accordance with claim 2 wherein each of a plurality of groups of said pairs of conductors are secured in a circular pattern around a central supporting wire to form a plurality of separable conductor clusters so that each of said clusters may be individually positioned within said refrigeration means.

* * * * *